(12) United States Patent
Itou

(10) Patent No.: US 8,760,093 B2
(45) Date of Patent: Jun. 24, 2014

(54) ELECTRONIC CONTROL APPARATUS FOR A VEHICLE

(75) Inventor: Akito Itou, Kariya (JP)

(73) Assignee: Denso Corporation, Kariya (JP)

( * ) Notice: Subject to any disclaimer, the term of this patent is extended or adjusted under 35 U.S.C. 154(b) by 300 days.

(21) Appl. No.: 13/231,316

(22) Filed: Sep. 13, 2011

(65) Prior Publication Data

US 2012/0062158 A1 Mar. 15, 2012

(30) Foreign Application Priority Data

Sep. 13, 2010 (JP) .................................. 2010-203970

(51) Int. Cl.
*H02H 7/08* (2006.01)

(52) U.S. Cl.
USPC ........................ 318/400.21; 318/567; 318/569

(58) Field of Classification Search
USPC ............. 318/400.21, 801, 567, 569; 361/600; 711/162
See application file for complete search history.

(56) References Cited

U.S. PATENT DOCUMENTS

| | | | |
|---|---|---|---|
| 6,775,609 B2 | 8/2004 | Ozeki et al. | |
| 8,165,743 B2 | 4/2012 | Oyama | |
| 2003/0144778 A1 | 7/2003 | Miyano | |
| 2009/0200970 A1 | 8/2009 | Kimura | |
| 2013/0117518 A1* | 5/2013 | Kobayashi | 711/162 |

FOREIGN PATENT DOCUMENTS

| | | |
|---|---|---|
| JP | H01-245322 | 9/1989 |
| JP | H10-111739 | 4/1998 |
| JP | P2000-240491 A | 9/2000 |
| JP | P2002-332909 A | 11/2002 |
| JP | P2003-167601 A | 6/2003 |
| JP | 2003-214233 | 7/2003 |
| JP | P2003-222053 A | 8/2003 |
| JP | P2005-117857 | 4/2005 |
| JP | P2008-187842 A | 8/2008 |
| JP | 2009-194964 | 8/2009 |

OTHER PUBLICATIONS

Japanese Office Action dated Aug. 21, 2012, issued in corresponding Japanese Application No. 2010-203970 with English translation.

* cited by examiner

Primary Examiner — Karen Masih
(74) Attorney, Agent, or Firm — Nixon & Vanderhye PC

(57) ABSTRACT

An electronic control apparatus for a vehicle, which operates a power conversion circuit connected to a rotating machine used as an in-vehicle traction unit to control controlled variables of the rotating machine, includes a controlling arithmetic processing unit which performs arithmetic processing to control the controlled variables of the rotating machine, and a monitoring arithmetic processing unit which monitors the controlling arithmetic processing unit. The monitoring arithmetic processing unit includes an on-monitoring prohibition unit which prohibits outputting an operation signal from the controlling arithmetic processing unit to the power conversion circuit until the controlling arithmetic processing unit is confirmed to be in a normal condition.

18 Claims, 6 Drawing Sheets

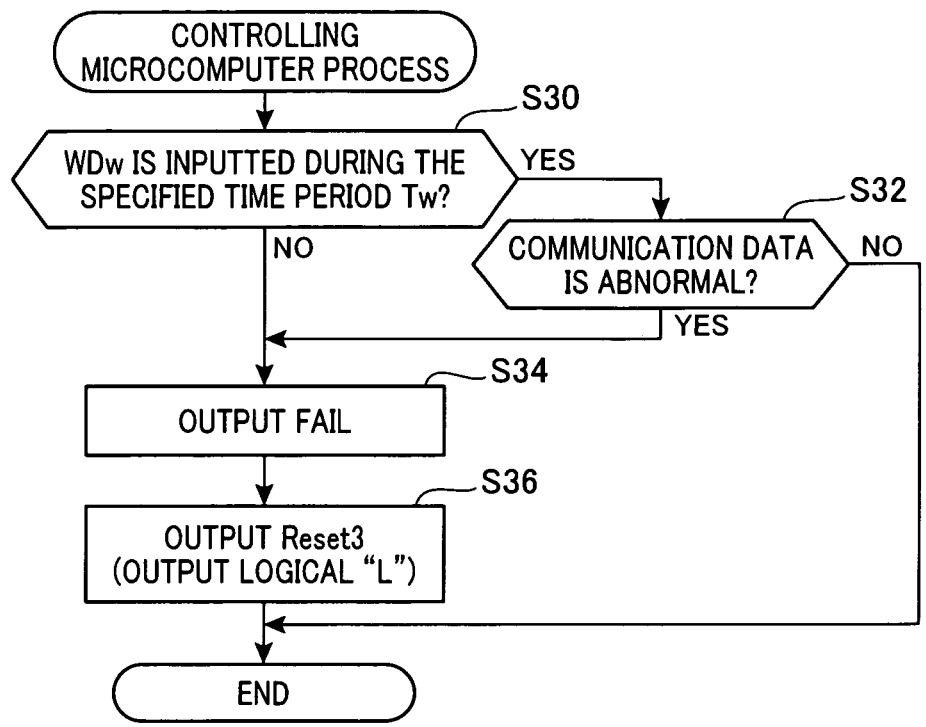
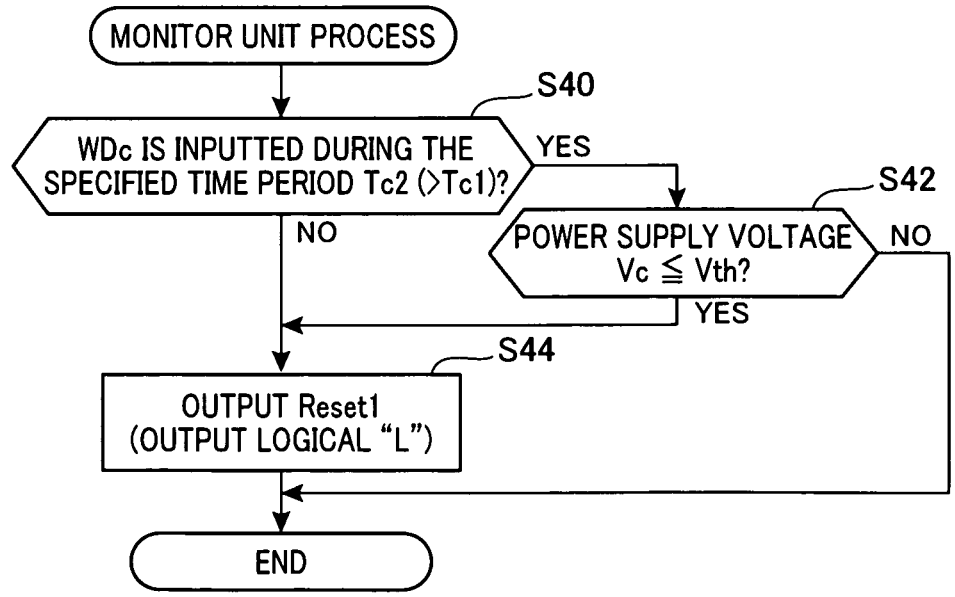

ELECTRONIC CONTROL APPARATUS FOR A VEHICLE

CROSS-REFERENCE TO RELATED APPLICATION

This application is based on and claims the benefit of priority from earlier Japanese Patent Application No. 2010-203970 filed Sep. 13, 2010, the description of which is incorporated herein by reference.

BACKGROUND

1. Technical Field

The present invention relates to an electronic control apparatus for a vehicle which operates a power conversion circuit connected to a rotating machine used as an in-vehicle traction unit to control controlled variables of the rotating machine.

2. Related Art

An example of this type of electronic control apparatus is disclosed in JP-A-2003-214233. The electronic control apparatus includes a CPU for controlling an engine used as an in-vehicle traction unit (controlling CPU), and a CPU for monitoring the controlling CPU (monitoring CPU). When the monitoring CPU detects abnormality of the controlling CPU, a process is performed in which the controlling CPU is reset, and the operation thereof is temporarily stopped.

After the controlling CPU is reset as described above, the controlling CPU recovers. Thereafter, the controlling CPU restarts the control of controlled variables of the traction unit. If the process has some abnormality, the controlling CPU is reset when the monitoring CPU detects the abnormality of the controlling CPU again. Hence, the controlling CPU may perform an abnormal process for the controlled variables of the traction unit until the monitoring CPU detects the abnormality of the controlling CPU again.

SUMMARY

An embodiment provides an electronic control apparatus for a vehicle which improves the reliability of the control of controlled variables of an in-vehicle traction unit.

As an aspect of the embodiment, an electronic control apparatus for a vehicle which operates a power conversion circuit connected to a rotating machine used as an in-vehicle traction unit to control controlled variables of the rotating machine, includes: a controlling arithmetic processing unit which performs arithmetic processing to control the controlled variables of the rotating machine; and a monitoring arithmetic processing unit which monitors the controlling arithmetic processing unit, wherein the monitoring arithmetic processing unit includes an on-monitoring prohibition unit which prohibits outputting an operation signal from the controlling arithmetic processing unit to the power conversion circuit until the controlling arithmetic processing unit is confirmed to be in a normal condition.

BRIEF DESCRIPTION OF THE DRAWINGS

In the accompanying drawings:

FIG. 3 is a flowchart showing a process performed by a controlling microcomputer according to the first embodiment;

FIG. 4 is a flowchart showing a process performed by a monitor unit according to the first embodiment;

DETAILED DESCRIPTION OF THE PREFERRED EMBODIMENTS

First Embodiment

With reference to the accompanying drawings, hereinafter are described embodiments. Throughout the drawings, components identical with or similar to each other are given the same numerals for the sake of omitting unnecessary explanation.

In the first embodiment, an electronic control apparatus for a vehicle is applied to an electronic control unit of a hybrid electric vehicle.

Figure 1:
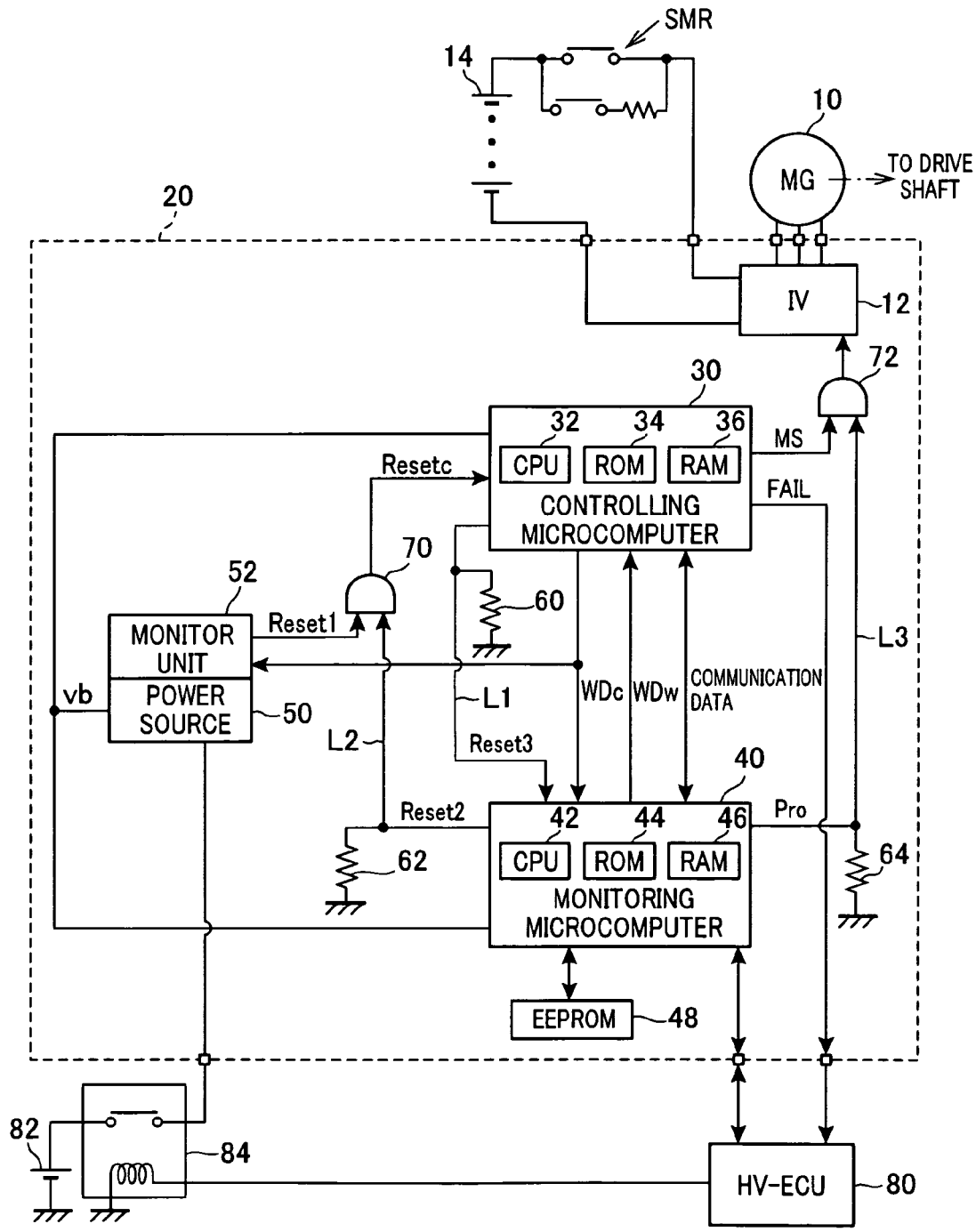
FIG. 1 is a diagram showing a system configuration according to a first embodiment.

FIG. 1 is a diagram showing a system configuration according to the first embodiment.

A motor generator 10 is an in-vehicle traction unit which is mechanically connected with drive wheels. The motor generator 10 is connected to a high-voltage battery 14 via an inverter 12 formed in a motor generator electronic control unit (MGECU 20) and a relay SMR. The inverter 12 is a DC-AC conversion circuit which converts DC voltage of the high-voltage battery 14 into AC voltage.

The MGECU 20 includes an arithmetic processing unit (controlling microcomputer 30) which performs calculation for controlling controlled variables of the motor generator 10. The controlling microcomputer 30 includes a central processing unit (CPU 32), a ROM 34 and a RAM 36. The controlling microcomputer 30 corresponds to a software process means (unit) which makes the CPU 32 perform a software process for a program stored in the ROM 34. Specifically, the controlling microcomputer 30 generates and outputs an operation signal MS for the inverter 12 to control the controlled variables.

In addition, the MGECU 20 includes an arithmetic processing unit (monitoring microcomputer 40) which monitors the controlling microcomputer 30. The monitoring microcomputer 40 includes a central processing unit (CPU 42), a ROM 44 and a RAM 46. The monitoring microcomputer 40 corresponds to a software process means (unit) which makes the CPU 42 perform a software process for a program stored in the ROM 44.

The MGECU 20 includes a power source 50 for the controlling microcomputer 30 and the monitoring microcomputer 40, and a monitor unit 52 which monitors the controlling microcomputer 30 by using the power source 50 as a feeding means (unit). The monitor unit 52 may be configured as, for example, a hardware process means (unit).

The MGECU 20 further includes an EEPROM 48. The EEPROM 48 is a storage device which can write and read data by the control of the monitoring microcomputer 40.

The monitoring microcomputer 40 periodically communicates with an external hybrid electronic control unit (HVECU 80). The controlling microcomputer 30 can output a fail signal FL to the HVECU 80.

The HVECU 80 controls the vehicle and issues a command concerning controlled variables of the motor generator 10 or the like to the MGECU 20. Hence, the MGECU 20 performs various processes for controlling the controlled variables of the motor generator 10 according to the command.

The HVECU 80 further has a function of operating a relay 84 for connecting a battery 82 to the power source 50. That is, the HVECU 80 has a function of performing on/off operation of the power source 50 of the MGECU 20. In addition, the HVECU 80 has a function of performing on/off-operation of the relay SMR.

Hereinafter, a monitoring function in the MGECU 20 for maintaining the reliability of the MGECU 20 will be explained. In the present embodiment, presence/absence of abnormality between the controlling microcomputer 30 and the monitoring microcomputer 40 is monitored based on watchdog signals WDc, WDw and two-way communication data between the controlling microcomputer 30 and the monitoring microcomputer 40.

Specifically, the controlling microcomputer 30 outputs the watchdog signal WDc, which is a periodical pulse signal, to the monitoring microcomputer 40 and the monitor unit 52. Hence, the monitoring microcomputer 40 and the monitor unit 52 can respectively determine that the controlling microcomputer 30 is in an abnormal condition, based on the fact that the watchdog signal WDc has not been inputted during a specified time period.

In addition, the monitoring microcomputer 40 outputs the watchdog signal WDw, which is a periodical pulse signal, to the controlling microcomputer 30. Hence, the controlling microcomputer 30 can determine that the monitoring microcomputer 40 is in an abnormal condition, based on the fact that the watchdog signal WDw has not been inputted during a specified time period.

Furthermore, the controlling microcomputer 30 and the monitoring microcomputer 40 perform communication with each other by which data is transmitted and received therebetween, and mutually monitor the presence/absence of abnormality based on the communication data. That is, for example, the controlling microcomputer 30 outputs data stored in the ROM 34 and the RAM 36. Then, the monitoring microcomputer 40 determines based on the data whether or not the controlling microcomputer 30 is in an abnormal condition. The data stored in the ROM 34 may be predetermined address data or may be address data specified by the monitoring microcomputer 40. Meanwhile, the data of the RAM 36 may be detection values of the controlled variables corresponding to the command value of the controlled variables received from the HVECU 80. In addition, the presence/absence of abnormality may be determined based on the data of the RAM 36 by, for example, writing the identical data on two sections in the RAM 36 and checking the written data against each other. The checking process may be performed by the monitoring microcomputer 40. However, the checking process may be performed by the controlling microcomputer 30. Then, the check result data may be outputted to the monitoring microcomputer 40.

Similarly, the monitoring microcomputer 40 outputs data stored in the ROM 44 or the RAM 46. The controlling microcomputer 30 determines whether or not the monitoring microcomputer 40 is in an is abnormal condition based on the data.

If it is determined that the microcomputer is in an abnormal condition based on the above presence/absence determination, the microcomputer is reset. This process is performed to prompt the microcomputer to recover to a normal condition.

Specifically, if the controlling microcomputer 30 determines that the monitoring microcomputer 40 is in an abnormal condition, the controlling microcomputer 30 outputs a reset signal Reset3 to the monitoring microcomputer 40 via a signal line L1. In the present embodiment, the reset signal Reset3 is referred to as a signal of logical "L" The signal line L1 has pulled down via a resistor 60. Hence, when the controlling microcomputer 30 cannot output a signal of logical "H", the signal line L1 is brought in a state which is the same as the state where a signal of logical "L" has outputted. Note that when the reset signal Reset3 is outputted, in the monitoring microcomputer 40, electric power supply is shut off for a constant time, and operation thereof is stopped (reset).

Meanwhile, if the monitoring microcomputer 40 determines that the controlling microcomputer 30 is in an abnormal condition, the monitoring microcomputer 40 outputs a reset signal Reset2 to the controlling microcomputer 30 via a signal line L2. In the present embodiment, the reset signal Reset2 is referred to as a signal of logical "L". The signal line L2 has pulled down via a resistor 62. Hence, when the monitoring microcomputer 40 cannot output a signal of logical "H", the signal line L2 is brought in a state which is the same as the state where a signal of logical "L" has outputted. Note that when the reset signal Reset2 is outputted, in the controlling microcomputer 30, electric power supply is shut off for a constant time, and operation thereof is stopped (reset).

When the monitor unit 52 determines that the controlling microcomputer 30 is in an abnormal condition based on the watchdog signal WDc, the monitor unit 52 outputs a reset signal Reset1 to a logic synthesis circuit 70. The output of the logic synthesis circuit 70 is a reset signal Resetc, which is a logical product signal of the reset signal Reset2 and the reset signal Reset1. The reset signal Resetc is inputted into the controlling microcomputer 30.

The monitor unit 52 outputs the reset signal Reset1 when the voltage of the power source 50 becomes equal to or lower than a specified voltage. The specified voltage is set according to a lower limit value of voltage (preferably, set to a value equal to or lower than the lower limit value) which can maintain the reliability of operation of the controlling microcomputer 30 and the monitoring microcomputer 40. As described above, when it is determined that the controlling microcomputer 30 and the monitor unit 52 are in abnormal conditions due to the lowered voltage, the monitor unit 52 resets the controlling microcomputer 30, whereby the monitoring microcomputer 40 is also reset. That is, since the signal line L1 has been pulled down by the resistor 60, the electric potential of the signal line L1 becomes logical "L" when the controlling microcomputer 30 is reset, whereby the monitoring microcomputer 40 is also reset.

When the monitoring microcomputer 40 is reset by the reset signal Reset3, the signal line L2 has been pulled down by the resistor 62. Hence, the signal line L2 becomes logical "L", whereby the controlling microcomputer 30 is also reset. This is the setting for preventing the controlling microcomputer 30 from operating in a state where the monitoring microcomputer 40 does not perform monitoring.

For example, when the monitoring microcomputer 40 is recovered from the reset after the controlling microcomputer 30 is recovered from the reset, the reliability of the control of controlled variables of the motor generator 10 can be lowered if the controlling is microcomputer 30 operates the inverter 12 before the monitoring microcomputer 40 confirms that the controlling microcomputer 30 is in a normal condition. To solve this problem, in the present embodiment, a shutoff circuit 72 is provided which shuts off the output of the operation signal MS from the controlling microcomputer 30 to the inverter 12 while the monitoring microcomputer 40 is reset. The shutoff circuit 72 shuts off the output of the operation signal MS from the controlling microcomputer 30 to the inverter 12 if a prohibition signal Pro is outputted from the monitoring microcomputer 40 to the signal line L3. In the present embodiment, the prohibition signal Pro is referred to as a signal of logical "L". In addition, the signal line L3 is pulled down via a resistor 64. Hence, since the electric potential of the signal line L3 becomes logical "L" while the monitoring microcomputer 40 is reset, the shutoff circuit 72 shuts off the operation signal MS.

The monitoring microcomputer 40 outputs the prohibition signal Pro until the monitoring microcomputer 40 confirms that the controlling microcomputer 30 is in a normal condition, even after the monitoring microcomputer 40 has recovered from the reset. Hence, the operation of the inverter 12 by the controlling microcomputer 30 is prohibited until the controlling microcomputer 30 is confirmed to be in a normal condition.

Figure 2:
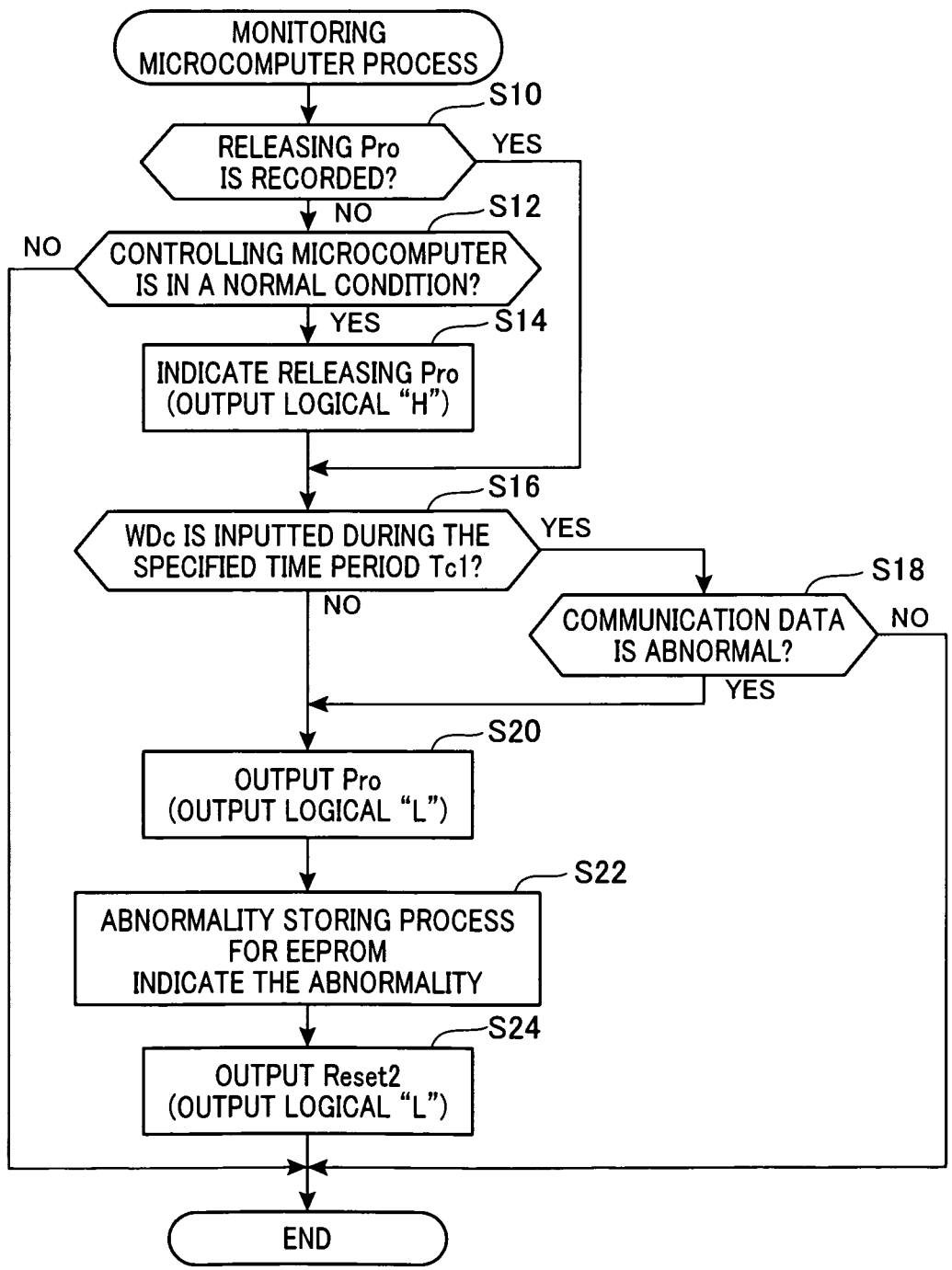
FIG. 2 is a flowchart showing a process performed by a monitoring microcomputer according to the first embodiment.

FIG. 2 is a flowchart showing a process performed by the monitoring microcomputer 40. This process is repeatedly performed, for example, at a predetermined cycle.

First, in step S10, it is determined whether the fact has been recorded that the prohibition signal Pro is released. This process is for determining whether or not the controlling microcomputer 30 is confirmed to be in a normal condition. In step S10, if negative judgment is made, in step S12, it is determined whether the controlling microcomputer 30 is in a normal condition. This process may be performed based on the data outputted from the controlling microcomputer 30, or may be performed based on the watchdog signal WDc. This process may be performed based on the data outputted from the controlling microcomputer 30 and the watchdog signal WDc. If abnormality information has been written in the EEPROM 48 by the process of step S22 described later, it is desirable to perform a process for confirming that the abnormality has been eliminated. In step S12, if positive judgment is made, in step S14, the prohibition signal Pro is released (a signal of logical "H" is outputted to the signal line L3).

If the process of step S14 is completed, or if positive judgment is made in step S10, in step S16, it is determined whether or not the watchdog signal WDc is inputted during a specified time period Tc1. In addition, in step S18, it is determined whether or not communication data transmitted from the controlling microcomputer 30 is abnormal. If negative judgment is made in step S16, or if positive judgment is made in step S18, in step S20, the prohibition signal Pro is outputted (a of logical "L" is outputted to the signal line L3). In succeeding step S22, data including abnormal content information is written in the EEPROM 48, and the fact that abnormality has occurred is indicated to the HVECU 80. In succeeding step S24, the reset signal Reset2 is outputted (a signal of logical "L" is outputted to the signal line L2).

Note that if the process of step S24 is completed, or if negative judgment is made in step S12 or S18, the whole process is temporarily ended.

FIG. 3 is a flowchart showing a process performed by the controlling microcomputer 30. This process is repeatedly performed, for example, at a predetermined cycle.

First, in step S30, it is determined whether or not the watchdog signal WDw is inputted during a specified time period Tw. In step S32, it is determined whether or not the communication data outputted from is the monitoring microcomputer 40 is abnormal. If negative judgment is made in step S30 or positive judgment is made in step S32, in step S34, a fail signal FAIL is outputted to the HVECU 80. In succeeding step S36, the reset signal Reset3 is outputted (a signal of logical "L" is outputted to the signal line L1).

Note that if the process of step S36 is completed, or if negative judgment is made in step S32, the whole process is temporarily ended.

FIG. 4 is a flowchart showing a process performed by the monitor unit 52. This process is repeatedly performed, for example, at a predetermined cycle.

First, in step S40, it is determined whether or not the watchdog signal WDc is inputted during a specified time period Tc2. The specified time period Tc2 is set so as to be longer than the specified time period Tc1. This setting is made so that the monitoring microcomputer 40 determines the abnormality of the controlling microcomputer 30 based on the watchdog signal WDc in advance to ensure the time for writing abnormality information in the EEPROM 48. In step S42, it is determined whether or not the voltage Vc of the power source 50 is equal to or lower than a specified voltage Vth. If negative judgment is made in step S40 or positive judgment is made in step S42, in step S44, the reset signal Reset1 is outputted.

Note that if the process of step S44 is completed, or if negative judgment is made in step S42, the whole process is temporarily ended.

Figure 5:
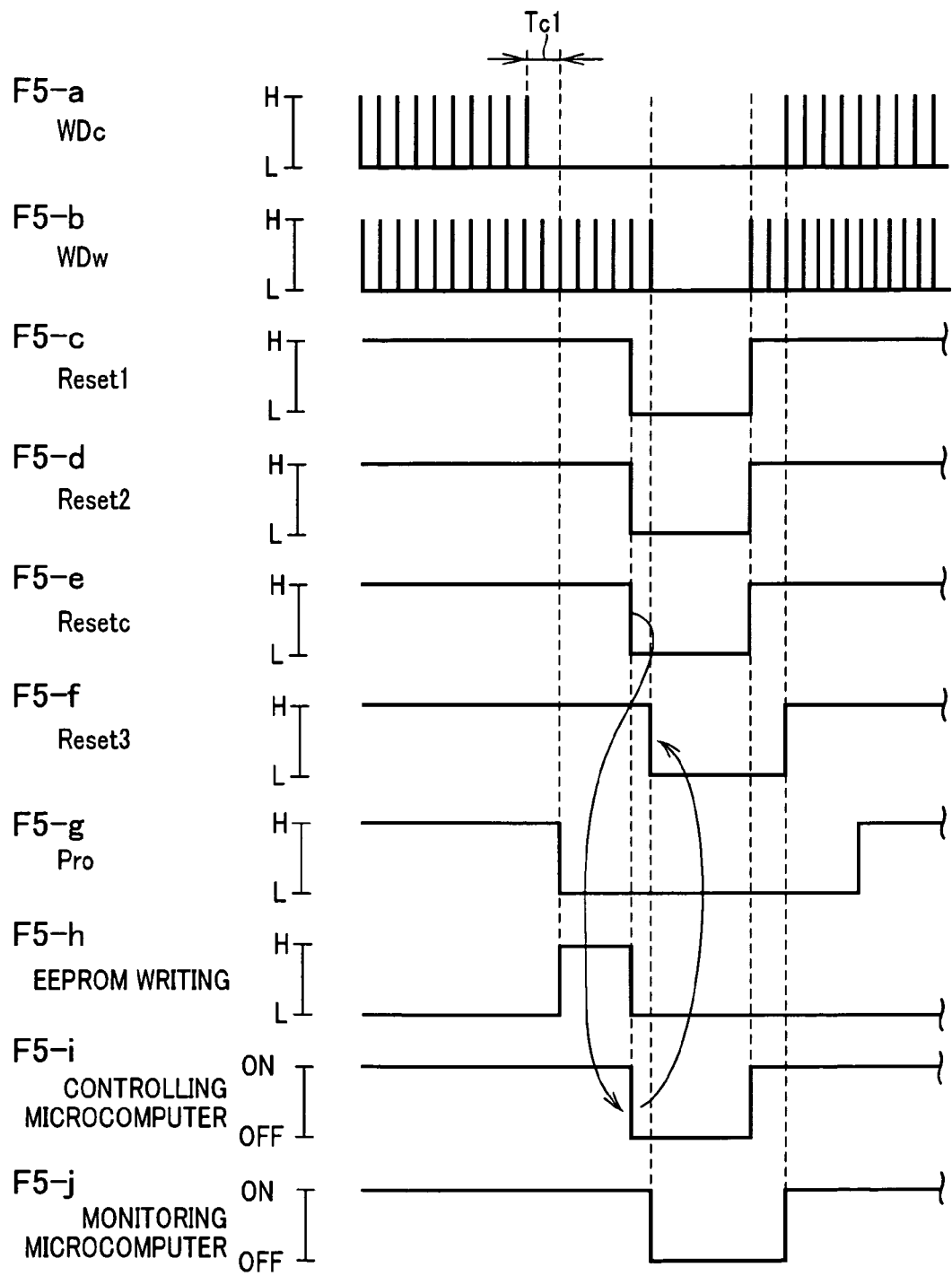
FIG. 5 is a time chart exemplifying a reset process of the first embodiment.

FIG. 5 shows an example of the reset process. Specifically, F5-a shows a transition of the watchdog signal WDc. F5-b shows a transition of the watchdog signal WDw. F5-c shows a transition of the reset signal Reset1. F5-d shows a transition of the reset signal Reset2. F5-e shows a transition of the reset signal Resetc. F5-f shows a transition of the reset signal Reset3. F5-g shows a transition of the prohibition signal Pro. F5-h shows a writing process of the EEPROM 48. F5-i shows a transition of the presence/absence of activation of the controlling microcomputer 30. F5-j shows a transition of the presence/absence of activation of the monitoring microcomputer 40.

First, the prohibition signal Pro is outputted based on the fact that the watchdog signal WDc is not inputted during the specified time period Tc1, and abnormal content information is written in the EEPROM 48. Then, if the reset signal Reset2 is outputted, the reset signal Resetc is inputted to the controlling microcomputer 30, whereby the controlling microcomputer 30 is reset. Hence, the reset signal Reset3 is inputted to the monitoring microcomputer 40, whereby the monitoring microcomputer 40 is reset. Thereafter, even when the controlling microcomputer 30 is recovered, the prohibition signal Pro is not released. Hence, the operation of the inverter 12 by the controlling microcomputer 30 is prohibited until the monitoring microcomputer 40 is recovered and confirms that the controlling microcomputer 30 is in a normal condition.

Note that the HVECU 80 determines the presence/absence of abnormality of the MGECU 20 based on the periodical communication with the monitoring microcomputer 40. According to the certain abnormal content, the relay 84 is subject to off-operation to forcibly stop the MGECU 20.

According to the embodiment described above, the following advantages can be obtained.

(1) The operation of the inverter 12 by the controlling microcomputer 30 is prohibited until the monitoring microcomputer 40 confirms that the controlling microcomputer 30 is in a normal condition. Hence, when the controlling microcomputer 30 is in an abnormal condition, the controlling microcomputer 30 can reliably be prevented from controlling the controlled variables of the motor generator 10. Consequently, the reliability of the control of the controlled variables of the motor generator 10 can be improved.

(2) The signal line L3 is pulled down, between the time when the monitoring microcomputer 40 is reset and the time when the monitoring microcomputer 40 is recovered, to prohibit the control of the controlling microcomputer 30. Hence, the controlling microcomputer 30 can be prevented from operating the inverter 12 while the monitoring microcomputer 40 is reset.

(3) When one of the controlling microcomputer 30 and the monitoring microcomputer 40 is reset, the other of the controlling microcomputer 30 and the monitoring microcomputer 40 is also reset. Hence, a situation can be avoided in which one of the controlling microcomputer 30 and the monitoring microcomputer 40 is activated.

(4) When the voltage of the power source 50 for the controlling microcomputer 30 and the monitoring microcomputer 40 has been lowered, the monitor unit 52 outputs the reset signal Reset1 to the controlling microcomputer 30. Hence, since the monitoring microcomputer 40 is also reset, the monitoring microcomputer 40 can be reset without providing an output path for a reset signal transmitted from the monitor unit 52 to the monitoring microcomputer 40.

(5) The reset signal Reset1 is used in common in both the case where the controlling microcomputer 30 is in an abnormal condition which is determined based on the watchdog signal WDc and the case where the controlling microcomputer 30 is in an abnormal condition which is determined based on the lowered voltage of the power source 50. Hence, the number of output ports of the monitor unit 52 and the number of communication paths for reset signals can be reduced.

(6) When the controlling microcomputer 30 is in an abnormal condition, the abnormality information is written in the EEPROM 48 by the monitoring microcomputer 40. Hence, the history of the abnormality can be held.

(7) The inverter 12 can be operated by the controlling microcomputer 30 and cannot be operated by the monitoring microcomputer 40. When the ability for controlling the controlled variables of the motor generator 10 is considered to be prevented from lowering, it is not required to assume the case where the monitoring microcomputer 40 operates the inverter 12.

(8) In the monitoring microcomputer 40, a function is installed which resets the controlling microcomputer 30 when it is determined that the controlling microcomputer 30 is in an abnormal condition. Hence, the monitoring microcomputer 40 can recover the controlling microcomputer 30 so as to be in a normal condition.

(9) In the monitoring microcomputer 40, a function is installed which determines that the controlling microcomputer 30 is in an abnormal condition based on the watchdog signal WDc. Hence, the presence/absence of abnormality can properly be determined.

(10) In the monitoring microcomputer 40, a function is installed which determines the presence/absence of abnormality of the controlling microcomputer 30 based on the periodical communication. Hence, the presence/absence of abnormality can properly be determined.

(11) In the controlling microcomputer 30, a function is installed which resets the monitoring microcomputer 40. Hence, the controlling microcomputer 30 can recover the monitoring microcomputer 40 so as to be in a normal condition.

(12) In the controlling microcomputer 30, a function is installed which determines that the monitoring microcomputer 40 is in an abnormal condition based on the watchdog signal WDw. Hence, the presence/absence of abnormality can properly be determined.

(13) In the controlling microcomputer 30, a function is installed which determines the presence/absence of abnormality of the monitoring microcomputer 40 based on the periodical communication. Hence, the presence/absence of abnormality can properly be determined.

(14) In each of the controlling microcomputer 30 and the monitoring microcomputer 40, a function is installed which indicates the abnormality. Hence, the HVECU 80 can detect the abnormal state.

(15) Periodical communication is performed between the monitoring microcomputer 40 and the HVECU 80. Hence, the HVECU 80 can rapidly and accurately detect the presence/absence of abnormality of the MGECU 20.

(16) The HVECU 80 can operate the relay 84. Hence, when the MGECU 20 is in an abnormal condition, the HVECU 80 can forcibly stop the MGECU 20.

Second Embodiment

In the second embodiment, configurations different from those of the first embodiment will be mainly described.

Figure 6:
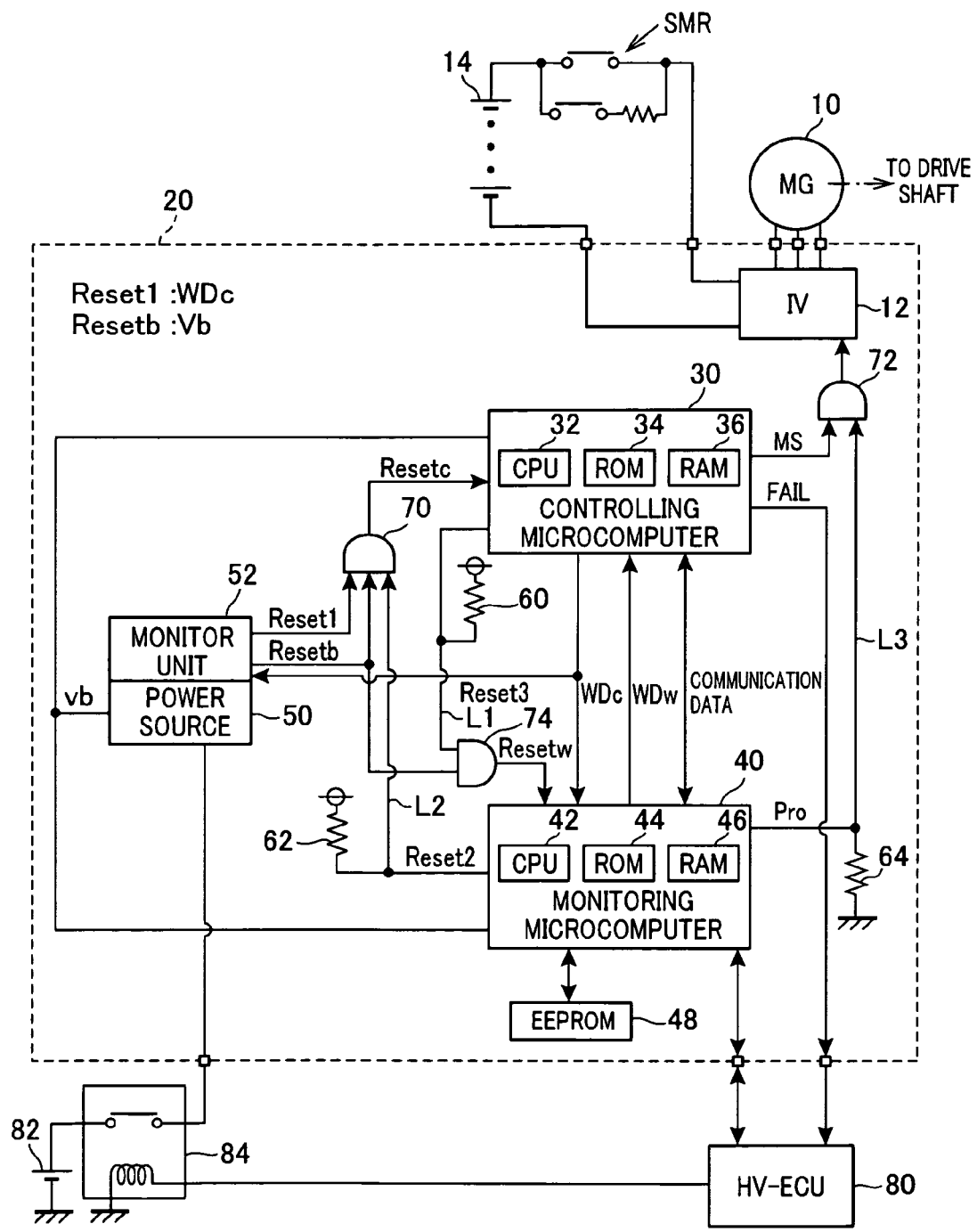
FIG. 6 is a diagram showing a system configuration according to a second embodiment.

FIG. 6 is a diagram showing a system configuration according to the second embodiment. In FIG. 6, components corresponding to those shown in FIG. 1 are given the same numerals.

In the present embodiment, the monitor unit 52 separately outputs the reset signal Reset1 based on the watchdog signal WDc and the reset signal Resetb based on the voltage of the power source 50. The reset signal Resetb is outputted to not only the controlling microcomputer 30 but also the monitoring microcomputer 40. That is, the reset signal Resetb is inputted to the logic synthesis circuit 70 and a logic synthesis circuit 74. The logic synthesis circuit 74 outputs a logic synthesis signal of the reset signal Resetb and the reset signal Reset3 as a reset signal Resetw to the monitoring microcomputer 40.

In the present embodiment, the monitoring microcomputer 40 is not reset due to the reset of the controlling microcomputer 30, and the controlling microcomputer 30 is not reset due to the reset of the monitoring microcomputer 40. This can be realized by pulling up the signal lines L1 and L2 by the resistors 60 and 62.

According to the above configuration, even when the controlling microcomputer 30 is reset by the monitor unit 52 or the monitoring microcomputer 40 based on the watchdog signal WDc, the monitoring microcomputer 40 is not reset in conjunction with the reset of the controlling microcomputer 30. Meanwhile, even when the monitoring microcomputer 40 is reset by the controlling microcomputer 30, the controlling microcomputer 30 is not reset in conjunction with the reset of the monitoring microcomputer 40. Note that the operation of the inverter 12 by the controlling microcomputer 30 is prohibited due to the prohibition signal Pro during, for example, the period of time for which the monitoring microcomputer 40 is reset.

According to the embodiment described above, the following advantages can be obtained in addition to the above advantages (1), (2), and (6) to (16) of the first embodiment.

(17) The reset signal Reset1 based on the watchdog signal WDc and the reset signal Resetb based on the voltage of the power source 50 are separately outputted. Hence, the monitoring microcomputer 40 is not reset when the abnormality is determined based on the watchdog signal WDc, and the monitoring microcomputer 40 can be reset when the abnormality is determined due to the lowered voltage.

Third Embodiment

In the third embodiment, configurations different from those of the first embodiment will be mainly described.

Figure 7:
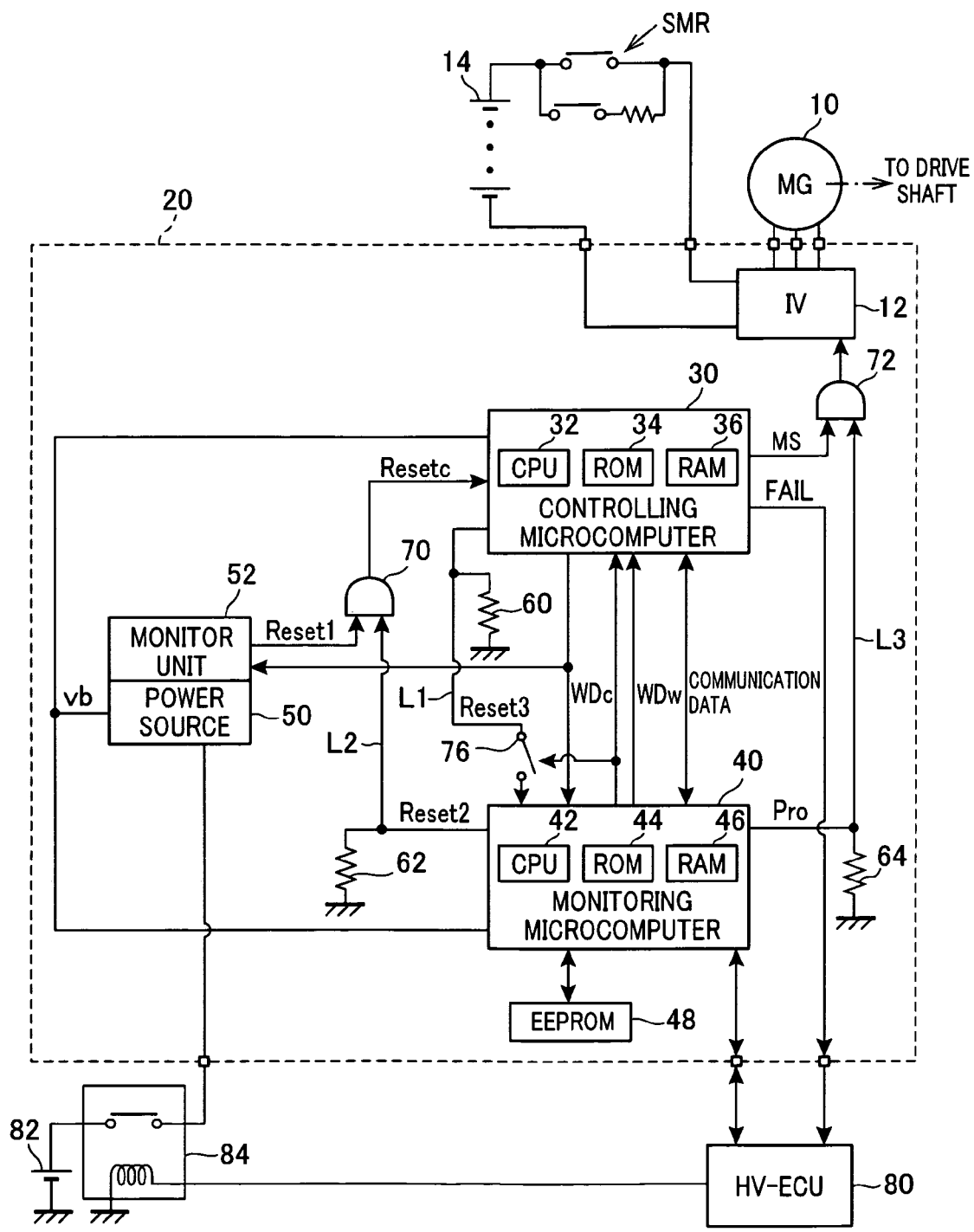
FIG. 7 is a diagram showing a system configuration according to a third embodiment.

FIG. 7 is a diagram showing a system configuration according to the third embodiment. In FIG. 7, components corresponding to those shown in FIG. 1 are given the same numerals.

In the present embodiment, a reset blocking switching element 76 is provided which opens and closes the signal line L1. The reset blocking switching element 76 can be operated by the monitoring microcomputer 40. This is the setting for avoiding a situation in which the monitoring microcomputer 40 is reset in conjunction with the reset of the controlling microcomputer 30 which is performed when the controlling microcomputer 30 is determined to be in an abnormal condition based on the watchdog signal WDc. That is, in the present embodiment, each signal outputted from the monitor unit 52 when the controlling microcomputer 30 is in an abnormal condition which is determined based on the watchdog signal WDc and when the voltage is lowered is integrated into the reset signal Reset1, whereby the number of output ports of the monitor unit 52 is reduced, and paths for reset signals are simplified. However, in this case, even when only the controlling microcomputer 30 is in an abnormal condition, the monitoring microcomputer 40 is also reset in conjunction with the abnormality. Hence, in the monitoring microcomputer 40, a function is installed which performs off-operation of the reset blocking switching element 76, which prevents the monitoring microcomputer 40 from being reset, only when the abnormality is determined based on the watchdog signal WDc.

Note that, as exemplified in the first embodiment, the time required for determining the abnormality based on the watchdog signal WDc is set in the monitoring microcomputer 40 so as to be shorter than that set in the monitor unit 52. Hence, before the monitor unit 52 outputs the reset signal Reset1 based on the watchdog signal WDc, the monitoring microcomputer 40 can perform off-operation of the reset blocking switching element 76.

Note that an operation signal for the reset blocking switching element 76 is also inputted to the controlling microcomputer 30. Hence, the controlling microcomputer 30 can detect the abnormal state in which the reset blocking switching element 76 is always subject to on-operation even in the period of time during which abnormality is not detected based on the watchdog signal WDc. If such an abnormal state has arisen, measures are taken in which, for example, the fail signal FAIL is outputted to the HVECU 80, or the operation of the inverter 12 is changed to a fail safe mode.

According to the embodiment described above, the following advantages can be obtained in addition to the above advantages (1) to (16) of the first embodiment.

(18) Providing the reset blocking switching element 76 can prevent even the monitoring microcomputer 40 from being reset when the controlling microcomputer 30 is determined to be in an abnormal condition based on the watchdog signal WDc. Meanwhile, when the voltage of the power source is lowered, the monitoring microcomputer 40 can be reset by resetting the controlling microcomputer 30 without outputting a reset signal from the monitor unit 52 to the monitoring microcomputer 40.

Other Embodiments

The above embodiments may be modified as follows.
Regarding the prohibition signal Pro:
The prohibition signal Pro is not limited to a signal representing a prohibition command by logical "L", but may be a signal representing a prohibition command by logical "H". In this case, a reset-time prohibition means (unit) may pull up the signal line L3.

Regarding the reset-time prohibition means (unit):
The reset-time prohibition means is not limited to a means for fixing the electric potential of the signal line L3. For example, the shutoff circuit 72 may release the shutoff state only when the signal transmitted via the signal line L3 has specific logic. In this case, since the shutoff state is not released when the signal line L3 is in a high impedance state, the reset-time prohibition means can be realized.

Regarding the automatic reset means (unit):
The automatic reset means is not limited to a means for connecting the signal line Li to the electric potential side of the reset signal Reset3 via the resistor 60. For example, the reset signal Reset3 may be a signal of logical "H", and the signal line Li may be pulled up via the resistor.

Regarding reset of both the monitoring microcomputer and the controlling microcomputer:
The configuration in which, when one of the monitoring microcomputer 40 and the controlling microcomputer 30 is reset, the other of the monitoring microcomputer 40 and the controlling microcomputer 30 is also reset, is not limited to a configuration in which the automatic reset means is provided to the signal line L1 and the signal line L2. For example, a configuration may be employed in which the reset signal Reset3 transmitted from the controlling microcomputer 30 is outputted to not only the monitoring microcomputer 40 but also the controlling microcomputer 30, the reset signal Reset2 transmitted from the monitoring microcomputer 40 is outputted to not only the controlling microcomputer 30 but also the monitoring microcomputer 40, and the reset signal Reset1 transmitted from the monitor unit 52 is outputted to both the controlling microcomputer 30 and the monitoring microcomputer 40.

Regarding the reset blocking means (unit):
The reset blocking means is not limited to a means which the monitoring microcomputer 40 can independently operate. For example, the reset blocking means may be operable by the monitoring microcomputer 40 under the condition that, for example, the watchdog signal WDc is not inputted.

Regarding the controlling arithmetic processing unit:
The controlling arithmetic processing unit is not limited to the controlling microcomputer 30. For example, the controlling arithmetic processing unit may be the CPU 32, and the ROM 34, the RAM 36 and the like may be shared with the controlling arithmetic processing unit and the monitoring arithmetic processing unit.

In addition, the controlling arithmetic processing unit is not limited to a software process means, and may be a dedicated hardware means. Note that, from the viewpoint of easily monitoring the process, digital processing is preferably to be performed.

In addition, the controlling microcomputer 30 may perform two-way communication with an external ECU (HVECU 80).

Regarding the monitoring arithmetic processing unit:
The monitoring arithmetic processing unit is not limited to a software process means, and may be a dedicated hardware means. Note that, from the viewpoint of easily monitoring the process, digital processing is preferably to be performed.

In addition, a function of resetting the controlling microcomputer 30 may not be installed in the monitoring microcomputer 40. Even in this case, providing a function of outputting the prohibition signal Pro can prevent the inverter 12 from being operated when the controlling microcomputer 30 is in an abnormal condition.

Furthermore, the monitoring arithmetic processing unit is not limited to a configuration in which the presence/absence of abnormality of the controlling microcomputer 30 is determined based on both the watchdog signal and the communication data. The monitoring arithmetic processing unit may determine the presence/absence of abnormality of the controlling microcomputer 30 based on one of the watchdog signal and the communication data.

Others:

The power conversion circuit, which supplies electric power to the is rotating machine, is not limited to an inverter, and may be the circuit disclosed in JP-A-2009-194964.

The power source for the monitoring microcomputer 40 and the power source for the controlling microcomputer 30 may be separately provided. In this case, when the voltage of the power source for the monitoring microcomputer 40 is lowered, a reset signal may be outputted only to the monitoring microcomputer 40. When the voltage of the power source for controlling microcomputer 30 is lowered, a reset signal may be outputted only to the controlling microcomputer 30.

The monitor unit may be separated into a unit for monitoring the presence/absence of abnormality of the controlling microcomputer 30 and a unit for monitoring the presence/absence of abnormality of the monitoring microcomputer 40.

In the first and third embodiments, the monitor unit 52 may output the reset signal Reset1 and the reset signal Resetb to the logic synthesis circuit 70. Even in this case, if the reset signal Resetb is not outputted to the monitoring microcomputer 40, the configuration Is effective in which the monitoring microcomputer 40 is &so reset by the reset of the controlling microcomputer 30.

In the first embodiment, output timings of the prohibition signal Pro and the reset signal Reset2 may be synchronized with each other. In this case, although storing the history of abnormality in the EEPROM 48 becomes difficult, advantages other than those of the first embodiment can be obtained.

The vehicle of the above embodiments is not limited to a hybrid electric vehicle, but may be, for example, an electric vehicle in which a means for storing energy in the vehicle, for example, a secondary battery and a fuel battery, is provided only for storing electric energy.

Hereinafter, aspects of the above-described embodiments will be summarized.

As an aspect of the embodiment, an electronic control apparatus for a vehicle which operates a power conversion circuit connected to a rotating machine used as an in-vehicle traction unit to control controlled variables of the rotating machine, including: a controlling arithmetic processing unit which performs arithmetic processing to control the controlled variables of the rotating machine; and a monitoring arithmetic processing unit which monitors the controlling arithmetic processing unit, wherein the monitoring arithmetic processing unit includes an on-monitoring prohibition unit which prohibits outputting an operation signal from the controlling arithmetic processing unit to the power conversion circuit until the controlling arithmetic processing unit is confirmed to be in a normal condition.

In the electronic control apparatus, since the on-monitoring prohibition unit is provided, an operation signal is prohibited from being outputted from the controlling arithmetic processing unit to the power conversion circuit until the monitoring arithmetic processing unit confirms that the controlling arithmetic processing unit is in a normal condition. Hence, when the controlling arithmetic processing unit is in an abnormal condition, the controlling arithmetic processing unit can reliably be prevented from controlling the controlled variables of the rotating machine. Consequently, the reliability of the control of the controlled variables of the rotating machine can be improved.

The electronic control apparatus further includes a reset-time prohibition unit which prohibits outputting an operation signal from the controlling arithmetic processing unit to the power conversion circuit between the time when the monitoring arithmetic processing unit is reset and the time when the monitoring arithmetic processing unit is recovered.

In the electronic control apparatus, since the reset-time prohibition unit is provided, the controlling arithmetic processing unit can be prevented from controlling the controlled variables of the rotating machine while the monitoring arithmetic processing unit is reset.

The electronic control apparatus further includes a shutoff unit which shuts off the operation signal outputted from the controlling arithmetic processing unit from being transmitted to the power conversion circuit. The on-monitoring prohibition unit outputs a prohibition signal to the shutoff unit, the shutoff signal prohibiting the operation signal from being outputted to the power conversion circuit until the controlling arithmetic processing unit is confirmed to be in a normal condition. When the monitoring arithmetic processing unit is reset, the reset-time prohibition unit fixes an electric potential of a signal line, through which the on-monitoring prohibition unit outputs the prohibition signal, to an electric potential of the prohibition signal.

In the electronic control apparatus, when one of the controlling arithmetic processing unit and the monitoring arithmetic processing unit is reset, the other of the controlling arithmetic processing unit and the monitoring arithmetic processing unit is also reset.

In the electronic control apparatus, a situation can be avoided in which one of the controlling arithmetic processing unit and the monitoring arithmetic processing unit is activated.

In the electronic control apparatus, the controlling arithmetic processing unit has a function of resetting the monitoring arithmetic processing unit. The electronic control apparatus further includes an automatic reset unit which sets an electric potential of a signal line, through which a reset signal is outputted from the controlling arithmetic processing unit to the monitoring arithmetic processing unit, to an electric potential of the reset signal.

In the electronic control apparatus, the monitoring arithmetic processing unit can be reset by resetting the controlling arithmetic processing unit.

The electronic control apparatus further includes a monitor unit which monitors voltage of a power source of the controlling arithmetic processing unit and the monitoring arithmetic processing unit. The monitor unit has a function of resetting the controlling arithmetic processing unit when the voltage of the power source is lowered.

In the electronic control apparatus, when the voltage is lowered, the controlling arithmetic processing unit is reset. Hence, the monitoring arithmetic processing unit is also reset by the automatic reset unit. Therefore, the monitoring arithmetic processing unit can be reset without outputting a reset signal from the monitor unit to the monitoring arithmetic processing unit.

In the electronic control apparatus, the controlling arithmetic processing unit has a function of outputting a watchdog signal to both the monitoring arithmetic processing unit and the monitor unit. The monitoring arithmetic processing unit has a function of resetting the controlling arithmetic processing unit if the controlling arithmetic processing unit is determined to be in an abnormal condition based on the watchdog signal outputted from the controlling arithmetic processing unit. The monitor unit has a function of resetting the controlling arithmetic processing unit if the controlling arithmetic processing unit is determined to be in an abnormal condition based on the watchdog signal outputted from the controlling arithmetic processing unit. The monitoring arithmetic processing unit determines that the controlling arithmetic processing unit is in an abnormal condition based on the watchdog signal during a time period shorter than a time period which the monitor unit requires to determine that the controlling arithmetic processing unit is in an abnormal condition based on the watchdog signal, and includes a reset blocking unit which blocks the input of a reset signal from the controlling arithmetic processing unit.

In the electronic control apparatus, by providing the reset blocking unit, the monitoring arithmetic processing unit is prevented From being reset when the controlling arithmetic processing unit is determined to be in an abnormal condition based on a watchdog signal outputted from the controlling arithmetic processing unit. Meanwhile, when the voltage of the power source is lowered, the monitoring arithmetic processing unit can be reset by resetting the controlling arithmetic processing unit without outputting a reset signal from the monitor unit to the monitoring arithmetic processing unit.

In the electronic control apparatus, the reset signal based on the watchdog signal outputted from the controlling arithmetic processing unit and the reset signal based on lowered voltage of the power source are outputted through the same signal line.

In the electronic control apparatus, the controlling arithmetic processing unit has a function of monitoring a process performed by the reset blocking unit.

In the electronic control apparatus, the controlling arithmetic processing unit can detect an abnormal state in which a process is performed for blocking the reset in an unexpected situation, for example, a condition other than the abnormal condition determined based on the watchdog signal outputted from the controlling arithmetic processing unit.

The electronic control apparatus further includes a monitor unit which monitors voltage of a power source of the controlling arithmetic processing unit and the monitoring arithmetic processing unit. The monitor unit has a function of resetting the controlling arithmetic processing unit if the controlling arithmetic processing unit is determined to be in an abnormal condition based on the watchdog signal outputted from the controlling arithmetic processing unit, and a function of resetting both the controlling arithmetic processing unit and the monitoring arithmetic processing unit if the voltage of the power source is lowered, a reset signal based on the watchdog signal outputted from the controlling arithmetic processing unit and a reset signal based on the lowered voltage of the power source are outputted to the controlling arithmetic processing unit via individual signal lines, and the reset signal based on the lowered voltage of the power source is further outputted to the monitoring arithmetic processing unit.

In the electronic control apparatus, the monitoring arithmetic processing unit is not reset when the abnormality is determined based on the watchdog signal of the controlling arithmetic processing unit, and the monitoring arithmetic processing unit can be reset when the abnormality is determined due to the lowered voltage.

In the electronic control apparatus, the monitoring arithmetic processing unit is not reset in conjunction with the reset of the controlling arithmetic processing unit.

The electronic control apparatus further includes a storage holding unit which holds data regardless of presence/absence of power feeding. When the controlling arithmetic processing unit is in an abnormal condition, the monitoring arithmetic processing unit stores information on the abnormality in the storage holding unit.

In the electronic control apparatus, since the storage holding unit is provided, the history of the abnormality can be held even when the monitoring arithmetic processing unit is reset.

In the electronic control apparatus, the power conversion circuit is electronically operable by the controlling arithmetic processing unit by connecting the controlling arithmetic processing unit and the power conversion circuit connected to the rotating machine via a signal line, and the power conversion circuit is not electronically operable by the monitoring arithmetic processing unit.

In the electronic control apparatus, the monitoring arithmetic processing unit has a function of resetting the controlling arithmetic processing unit if the controlling arithmetic processing unit is determined to be in an abnormal condition based on a signal outputted from the controlling arithmetic processing unit.

When an arithmetic processing unit is in an abnormal condition, the arithmetic processing unit is often recovered to a normal condition by being reset. Hence, the function of resetting is installed.

In the electronic control apparatus, the controlling arithmetic processing unit has a function of outputting a watchdog signal to the monitoring arithmetic processing unit. The monitoring arithmetic processing unit determines that the controlling arithmetic processing unit is in an abnormal condition based on the fact that the controlling arithmetic processing unit has not outputted the watchdog signal.

In the electronic control apparatus, the controlling arithmetic processing unit and the monitoring arithmetic processing unit periodically communicate with each other. The monitoring arithmetic processing unit determines presence/absence of abnormality of the controlling arithmetic processing unit based on the periodical communication.

In the electronic control apparatus, the controlling arithmetic processing unit has a function of resetting the monitoring arithmetic processing unit if the monitoring arithmetic processing unit is determined to be in an abnormal condition based on a signal outputted from the monitoring arithmetic processing unit.

When an arithmetic processing unit is in an abnormal condition, the arithmetic processing unit is often recovered to a normal condition by being reset. Hence, the function of resetting is installed.

In the electronic control apparatus, the monitoring arithmetic is processing unit has a function of outputting a watchdog signal to the controlling arithmetic processing unit. The controlling arithmetic processing unit determines that the monitoring arithmetic processing unit is in an abnormal condition based on the fact that the monitoring arithmetic processing unit has not outputted the watchdog signal.

In the electronic control apparatus, the controlling arithmetic processing unit and the monitoring arithmetic processing unit periodically communicate with each other. The controlling arithmetic processing unit determines presence/absence of abnormality of the monitoring arithmetic processing unit based on the periodical communication.

In the electronic control apparatus, the controlling arithmetic processing unit and the monitoring arithmetic processing unit respectively indicate the fact that abnormality has occurred to an external unit.

In the electronic control apparatus, even when one of the controlling arithmetic processing unit and the monitoring arithmetic processing unit is in an abnormal condition, the information on the abnormality can be indicated by the other of the controlling arithmetic processing unit and the monitoring arithmetic processing unit.

In the electronic control apparatus, the monitoring arithmetic processing unit periodically communicates with an external electronic control unit.

In the electronic control apparatus, due to the periodical communication between the monitoring arithmetic processing unit and the external electronic control unit, the external electronic control unit can rapidly and accurately detect the presence/absence of abnormality of the electronic control apparatus.

The electronic control apparatus is supplied with electric power via a relay, and the relay is operated by an external electronic control unit.

In the electronic control apparatus, the external electronic control unit can shut off the electric power supply to the electronic control apparatus. Consequently, the operation of the electronic control apparatus can be forcibly stopped.

It will be appreciated that the present invention is not limited to the configurations described above, but any and all modifications, variations or equivalents, which may occur to those who are skilled in the art, should be considered to fall within the scope of the present invention.

What is claimed is:

1. An electronic control apparatus for a vehicle which operates a power conversion circuit connected to a rotating machine used as an in-vehicle traction unit to control controlled variables of the rotating machine, comprising:
    a controlling arithmetic processing unit which performs arithmetic processing to control the controlled variables of the rotating machine; and
    a monitoring arithmetic processing unit which monitors the controlling arithmetic processing unit, and
    a reset-time prohibition unit which prohibits outputting an operation signal from the controlling arithmetic processing unit to the power conversion circuit between the time when the monitoring arithmetic processing unit is reset and the time when the monitoring arithmetic processing unit is recovered, wherein
    the monitoring arithmetic processing unit includes an on-monitoring prohibition unit which prohibits outputting the operation signal from the controlling arithmetic processing unit to the power conversion circuit until the controlling arithmetic processing unit is confirmed to be in a normal condition, and
    when one of the controlling arithmetic processing unit and the monitoring arithmetic processing unit is reset, the other of the controlling arithmetic processing unit and the monitoring arithmetic processing unit is also reset.

2. The electronic control apparatus according to claim 1, further comprising a shutoff unit which shuts off the operation signal outputted from the controlling arithmetic processing unit from being transmitted to the power conversion circuit, wherein
    the on-monitoring prohibition unit outputs a prohibition signal to the shutoff unit, the shutoff signal prohibiting the operation signal from being outputted to the power conversion circuit until the controlling arithmetic processing unit is confirmed to be in a normal condition, and
    when the monitoring arithmetic processing unit is reset, the reset-time prohibition unit fixes an electric potential of a signal line, through which the on-monitoring prohibition unit outputs the prohibition signal, to an electric potential of the prohibition signal.

3. The electronic control apparatus according to claim 1, wherein
    the controlling arithmetic processing unit has a function of resetting the monitoring arithmetic processing unit, and further including
    an automatic reset unit which sets an electric potential of a signal line, through which a reset signal is outputted from the controlling arithmetic processing unit to the monitoring arithmetic processing unit, to an electric potential of the reset signal.

4. The electronic control apparatus according to claim 3, further comprising a monitor unit which monitors voltage of a power source of the controlling arithmetic processing unit and the monitoring arithmetic processing unit, wherein
    the monitor unit has a function of resetting the controlling arithmetic processing unit when the voltage of the power source is lowered.

5. The electronic control apparatus according to claim 4, wherein
    the controlling arithmetic processing unit has a function of outputting a watchdog signal to both the monitoring arithmetic processing unit and the monitor unit,
    the monitoring arithmetic processing unit has a function of resetting the controlling arithmetic processing unit if the controlling arithmetic processing unit is determined to be in an abnormal condition based on the watchdog signal outputted from the controlling arithmetic processing unit,
    the monitor unit has a function of resetting the controlling arithmetic processing unit if the controlling arithmetic processing unit is determined to be in an abnormal condition based on the watchdog signal outputted from the controlling arithmetic processing unit, and
    the monitoring arithmetic processing unit determines that the controlling arithmetic processing unit is in an abnormal condition based on the watchdog signal during a time period shorter than a time period which the monitor unit requires to determine that the controlling arithmetic processing unit is in an abnormal condition based on the watchdog signal, and includes a reset blocking unit which blocks the input of a reset signal from the controlling arithmetic processing unit.

6. The electronic control apparatus according to claim 5, wherein
    the reset signal based on the watchdog signal outputted from the controlling arithmetic processing unit and the reset signal based on lowered voltage of the power source are outputted through the same signal line.

7. The electronic control apparatus according to claim 5, wherein
    the controlling arithmetic processing unit has a function of monitoring a process performed by the reset blocking unit.

8. The electronic control apparatus according to claim 1, further comprising a monitor unit which monitors voltage of a power source of the controlling arithmetic processing unit and the monitoring arithmetic processing unit, wherein
    the monitor unit has a function of resetting the controlling arithmetic processing unit if the controlling arithmetic processing unit is determined to be in an abnormal condition based on the watchdog signal outputted from the controlling arithmetic processing unit, and a function of resetting both the controlling arithmetic processing unit and the monitoring arithmetic processing unit if the voltage of the power source is lowered, a reset signal based on the watchdog signal outputted from the controlling arithmetic processing unit and a reset signal based on the lowered voltage of the power source are outputted to the controlling arithmetic processing unit via individual signal lines, and the reset signal based on the lowered voltage of the power source is further outputted to the monitoring arithmetic processing unit.

9. The electronic control apparatus according to claim 8, wherein
the monitoring arithmetic processing unit is not reset in conjunction with the reset of the controlling arithmetic processing unit.

10. The electronic control apparatus according to claim 1, further comprising a storage holding unit which holds data regardless of presence/absence of power feeding, wherein
when the controlling arithmetic processing unit is in an abnormal condition, the monitoring arithmetic processing unit stores information on the abnormality in the storage holding unit.

11. The electronic control apparatus according to claim 1, wherein
the power conversion circuit is electronically operable by the controlling arithmetic processing unit by connecting the controlling arithmetic processing unit and the power conversion circuit connected to the rotating machine via a signal line, and the power conversion circuit is not electronically operable by the monitoring arithmetic processing unit.

12. The electronic control apparatus according to claim 1, wherein
the monitoring arithmetic processing unit has a function of resetting the controlling arithmetic processing unit if the controlling arithmetic processing unit is determined to be in an abnormal condition based on a signal outputted from the controlling arithmetic processing unit.

13. The electronic control apparatus according to claim 12, wherein
the controlling arithmetic processing unit has a function of outputting a watchdog signal to the monitoring arithmetic processing unit, and
the monitoring arithmetic processing unit determines that the controlling arithmetic processing unit is in an abnormal condition based on the fact that the controlling arithmetic processing unit has not outputted the watchdog signal.

14. The electronic control apparatus according to claim 1, wherein
the controlling arithmetic processing unit and the monitoring arithmetic processing unit periodically communicate with each other, and
the monitoring arithmetic processing unit determines presence/absence of abnormality of the controlling arithmetic processing unit based on the periodical communication.

15. The electronic control apparatus according to claim 1, wherein
the controlling arithmetic processing unit has a function of resetting the monitoring arithmetic processing unit if the monitoring arithmetic processing unit is determined to be in an abnormal condition based on a signal outputted from the monitoring arithmetic processing unit.

16. The electronic control apparatus according to claim 15, wherein
the monitoring arithmetic processing unit has a function of outputting a watchdog signal to the controlling arithmetic processing unit, and
the controlling arithmetic processing unit determines that the monitoring arithmetic processing unit is in an abnormal condition based on the fact that the monitoring arithmetic processing unit has not outputted the watchdog signal.

17. The electronic control apparatus according to claim 1, wherein
the controlling arithmetic processing unit and the monitoring arithmetic processing unit periodically communicate with each other, and
the controlling arithmetic processing unit determines presence/absence of abnormality of the monitoring arithmetic processing unit based on the periodical communication.

18. The electronic control apparatus according to claim 1, wherein
the controlling arithmetic processing unit and the monitoring arithmetic processing unit respectively indicate the fact that abnormality has occurred to an external unit.

* * * * *